(12) United States Patent
Bish et al.

(10) Patent No.: US 7,991,822 B2
(45) Date of Patent: Aug. 2, 2011

(54) PROPAGATION OF UPDATES FOR ATTRIBUTES OF A STORAGE OBJECT FROM AN OWNER NODE OF THE STORAGE OBJECT TO OTHER NODES

(75) Inventors: Thomas William Bish, Tucson, AZ (US); Mark Albert Reid, Tucson, AZ (US); Joseph M. Swingler, Tucson, AZ (US); Michael Wayne Young, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/847,214

(22) Filed: Aug. 29, 2007

(65) Prior Publication Data

US 2009/0063411 A1 Mar. 5, 2009

(51) Int. Cl.
*G06F 15/16* (2006.01)
(52) U.S. Cl. ........ 709/200; 709/223; 709/224; 709/225; 709/226; 707/704; 707/687; 714/13
(58) Field of Classification Search .................... 709/200
See application file for complete search history.

(56) References Cited

U.S. PATENT DOCUMENTS

| | | | |
|---|---|---|---|
| 5,826,265 A | 10/1998 | Van Huben et al. | |
| 5,909,553 A | 6/1999 | Campbell et al. | |
| 6,292,905 B1 * | 9/2001 | Wallach et al. | 709/239 |
| 6,574,654 B1 | 6/2003 | Simmons et al. | |
| 6,618,744 B1 | 9/2003 | Simmons et al. | |
| 6,668,295 B1 | 12/2003 | Chan | |
| 6,708,198 B1 | 3/2004 | Simmons et al. | |
| 6,775,673 B2 | 8/2004 | Mahalingam et al. | |

(Continued)

FOREIGN PATENT DOCUMENTS

| | | |
|---|---|---|
| WO | 98/03912 | 1/1998 |
| WO | 2005/045644 | 5/2005 |

OTHER PUBLICATIONS

U.S. Patent Application entitled "Securing Transfer of Ownership of a Storage Object from an Unavailable Owner Node to Another Node", Serial No. unknown, filed Aug. 31, 2007, by inventors T.W. Bish, T. Niranjan, M.A. Reid, J.M. Swingler, and M.W. Young.

U.S. Patent Application entitled "Transfer of Ownership of a Storage Object in Response to an Original Owner Node Becoming Available After a Period of Unavailability", Serial No. unknown, filed Aug. 31, 2007, by inventors T.W. Bish, J.W. Peake, M.A. Reid, and J.M. Swingler.

(Continued)

*Primary Examiner* — Dohm Chankong
*Assistant Examiner* — Neeraj Utreja
(74) *Attorney, Agent, or Firm* — Rabindranath Dutta; Konrad Raynes & Victor LLP (57) ABSTRACT

Local versions of attributes of a storage object are maintained at a plurality of nodes, wherein a first attribute designates a first node of the plurality of nodes as an owner node for the storage object, and wherein a second attribute includes information to resolve validity of ownership of the storage object among the plurality of nodes. The owner node communicates changes to be made to the local versions of the attributes at other nodes of the plurality of nodes. A second node of the plurality of nodes requests ownership of the storage object. The first attribute is updated to designate the second node of the plurality of nodes as the owner node, in response to determining from the second attribute that the validity of ownership of the storage object allows the second node to inherit ownership of the storage object once the first node surrenders ownership of the storage object.

12 Claims, 5 Drawing Sheets

U.S. PATENT DOCUMENTS

| | | | |
|---|---|---|---|
| 6,865,157 B1* | 3/2005 | Scott et al. | 370/242 |
| 7,085,897 B2 | 8/2006 | Blake et al. | |
| 7,324,995 B2* | 1/2008 | Findleton et al. | 707/8 |
| 2003/0065782 A1 | 4/2003 | Nishanov et al. | |
| 2005/0021573 A1* | 1/2005 | McDermott et al. | 707/204 |
| 2006/0184528 A1* | 8/2006 | Rodeh | 707/8 |

OTHER PUBLICATIONS

O. Schoenborn, "Strict Ownership, STL Containers, & the NoPtr Library", C/C++ Users Journal, vol. 22, No. 5, May 2004, pp. 40-43.

* cited by examiner

PROPAGATION OF UPDATES FOR ATTRIBUTES OF A STORAGE OBJECT FROM AN OWNER NODE OF THE STORAGE OBJECT TO OTHER NODES

BACKGROUND

1. Field

The disclosure relates to a method, system, and article of manufacture for the propagation of updates for attributes of a storage object from an owner node of the storage object to other nodes.

2. Background

In a distributed storage system, a plurality of distributed nodes, such as distributed computational devices, may have access to a plurality of logical storage volumes, wherein the logical storage volumes are logical representations of physical storage volumes that may store data and metadata. The plurality of logical storage volumes may be distributed across the plurality of distributed nodes and may be shared among some or all of the plurality of distributed nodes. Some or all of the nodes of the plurality of distributed nodes may be able to access, read, write, and perform other operations on the shared logical storage volumes.

The logical storage volumes may also be referred to as storage objects, wherein the storage objects may be shared among some or all of the plurality of distributed nodes of the distributed storage system. Storage objects may also comprise other units of data representations besides logical storage volumes.

SUMMARY OF THE PREFERRED EMBODIMENTS

Provided are a method, system, and article of manufacture wherein local versions of attributes of a storage object are maintained at a plurality of nodes, wherein a first attribute designates a first node of the plurality of nodes as an owner node for the storage object, and wherein a second attribute includes information to resolve validity of ownership of the storage object among the plurality of nodes. The owner node communicates changes to be made to the local versions of the attributes at other nodes of the plurality of nodes. A second node of the plurality of nodes requests ownership of the storage object. The first attribute is updated to designate the second node of the plurality of nodes as the owner node, in response to determining from the second attribute that the validity of ownership of the storage object allows the second node to inherit ownership of the storage object once the first node surrenders ownership of the storage object.

In additional embodiments the owner node reserves a lock on the storage object, in response to determining that the owner node needs to modify data of the storage object. The owner node modifies the data of the storage object, in response to reserving the lock. The owner node releases the lock on the storage object, in response to modifying the data on the storage object, wherein the releasing of the lock permits a node that is different from the owner node in the plurality of nodes to request ownership of the storage object.

In yet additional embodiments, a request for an operation on the storage object is received at the owner node from a third node of the plurality of nodes, wherein the operation is capable of being performed in parallel on the storage object while the storage object is currently busy within the owner node. The owner node executes the operation on the storage object on behalf of the third node, wherein the executing of the operation on the storage object by the owner node allows the operation to succeed without movement of ownership of the storage object, and wherein the executing of the operation on the storage object by the owner node serializes all parallel operations.

In further embodiments, each node of the plurality of nodes comprises a cluster of a plurality of clusters, wherein the plurality of clusters comprise a domain, wherein the storage object is a shared object for the plurality of clusters of the domain, and wherein a stored object is a logical object that is physically stored on a device included in the domain. A request is received at the owner node from a third node, for transfer of ownership of the storage object. A determination is made as to whether a lock on the storage object is reserved by the owner node. The ownership is transferred to the third node, in response to determining that the lock on the storage object is not reserved by the owner node.

In yet further embodiments, the attributes are properties of the storage object, wherein the owner node receives a request for a query operation on the storage object or on properties of the storage object on behalf of a third node, and the owner node performs the query operation on the storage object without transfer of ownership of the storage object and without being required to lock down the storage object. The owner node initiates equivalent updates against the storage object and corresponding properties of the storage object against one or more other nodes when the one or more other nodes are available. The owner node tracks pending updates against the storage object and corresponding properties of the storage object against the one or more other nodes when the one or more other nodes become unavailable. In certain embodiments, only the owner node can reconcile all pending updates against the storage object and the corresponding properties of the storage object to the one or more other nodes when the one or more other nodes become available. The owner node initiates a transfer of ownership of the storage object to another node of the plurality of nodes when the owner node is to become unavailable. The owner node performs a reconciliation process prior to surrendering ownership of the storage object to another node that is marked as down-level with respect to the storage object or to the corresponding properties of the storage object, wherein the another node requests the reconciliation process without ownership transfer. In further embodiments updates to properties of a storage object within another node initiated by the owner node only occurs after validating ownership level properties of the owner node with respect to ownership level properties of the another node.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In a composite storage server in which a plurality distributed sites have equal access to a plurality of logical storage volumes, certain embodiments provide mechanisms to atomically manage the usage of the shared logical storage volumes. The equal access to a logical storage volume may be initiated by a site's internal mechanisms or by requests issued directly to a distributed site. In certain embodiments one distributed site is guaranteed exclusive access to one particular storage volume within the composite storage server. In addition, in certain embodiments each distributed site within the composite library may have the ability to depend on this exclusive distributed site for the most consistent view of the composite storage server with respect to the storage volume exclusively accessed by the exclusive distributed site. Furthermore, this exclusive right to the storage volume may cause the privileged distributed site to execute commands on behalf of the peers of the privileged distributed site when non-exclusive commands co-exist with protected commands.

In certain embodiments only one distributed site within the composite storage server can have exclusive ownership of a storage volume at any given time. The ownership carries with it responsibilities and privileges with regards to the owned storage volume. The ownership can be explicitly surrendered or passed on to a distributed peer node using an ownership exchange process. The current owner node of a storage volume has ultimate authority on: (a) any consistency associated with the storage volume; (b) associated properties of the storage volume; and, (c) any external entities directly mapped to the storage volume. The owner node also has the ability to invalidate or synchronize the owned storage volume at peer distributed sites when needed. Furthermore, an ownership protocol may use an appropriate update mechanism to ensure there are no race conditions during ownership exchanges.

In certain embodiments, each distributed site has a token or object which is used to store both local and composite properties associated with a particular storage volume. This token includes information on the current owner within the composite storage server. In addition, the ownership is tracked with an additional ownership version property also referred to as an ownership validity indicator. The version property may be increased with each ownership exchange and synchronized among all distributed sites within the composite storage server. The current owner is responsible for updating the current owner and the ownership version value within each distributed site's token. When ownership is in question, the site with the largest value of the ownership version determines which distributed site is the current owner.

The ownership protocol also allows the marking of a storage volume as busy. Ownership alone does not provide exclusive access to a storage volume's contents and/or properties without first reserving the storage volume, particularly in situations in which multiple processes have equal access to the same storage volume within a single distributed site. Therefore, once ownership is obtained or verified, the token is moved to a reserved state. Once the operation has completed, the token can be unlocked. Ownership will remain at the distributed site until a neighboring distributed peer explicitly requests ownership transfer. If an ownership request occurs during the busy state, the ownership request will be denied with a busy or in-use response.

In addition, a storage volume may have associated processes or functions that can be run against the storage volume, wherein the processes or functions can be executed in parallel to the exclusively protected commands. Since ownership cannot be transferred during execution of exclusively protected commands, the processes or functions are forwarded to the current owner node of the storage volume. The current owner node of the storage volume may then execute the command on behalf of one of the peers of the current owner node. Any updates which may result are controlled by the owner node and only when the exclusive access and all parallel forwarded operation have completed will the storage volume ownership be in a state in which ownership transfer is permitted.

Exemplary Embodiments

Figure 1:
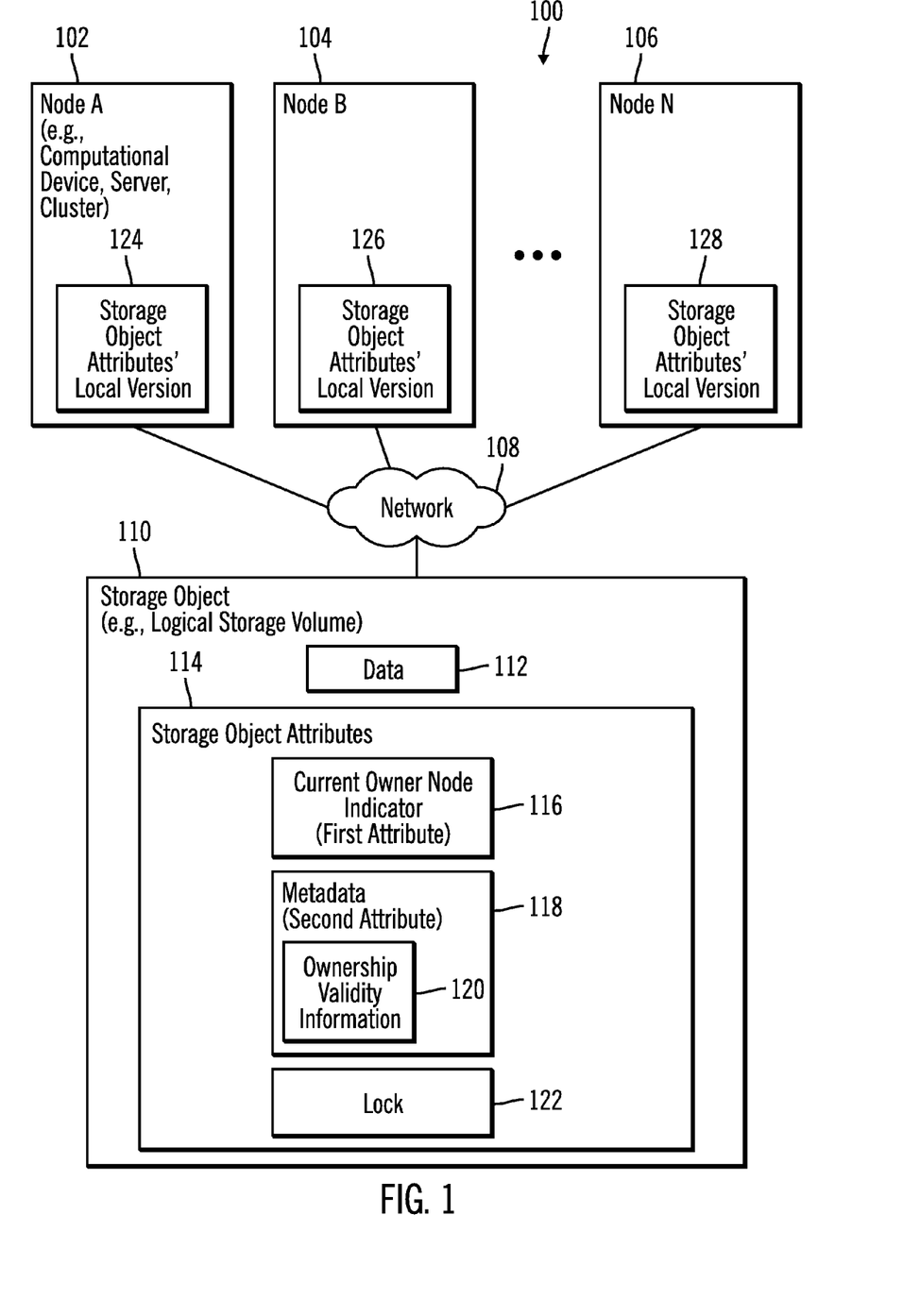
FIG. 1 illustrates a block diagram of a computing environment that includes a plurality of nodes, in accordance with certain embodiments.

FIG. 1 illustrates a block diagram of a computing environment 100 that includes a plurality of nodes 102, 104, 106 that are coupled via a network 108, in accordance with certain embodiments. While FIG. 1 shows three nodes, node A 102, node B 104, and node N 106, in alternative embodiments a different number of nodes may be coupled via the network 108.

The nodes 102, 104, 106 may comprise any suitable computational platform, including those presently known in the art, such as, a server, a personal computer, a workstation, a mainframe, a midrange computer, a network appliance, a palm top computer, a telephony device, a blade computer, a hand held computer, etc. Each of the nodes 102, 104, 106 may also represent a cluster, i.e., a collection of nodes.

A storage object 110, such as a logical storage volume, may be shared among some or all of the plurality of nodes 102, 104, 106. The storage object 110 may reside in a storage device coupled to the network or may reside in any of the nodes 102, 104, 106 or may reside in some other element of the computing environment 100. While the storage object 110 is shown to represent a logical storage volume, in alternative embodiments the storage object 110 may represent any other unit of storage, such as a logical block, a segment, etc. While only one storage object 110 has been shown, a plurality of storage objects may be distributed in the computing environment 100, wherein the plurality of storage objects may be shared by the plurality of nodes 102, 104, 106.

Associated with the storage object 110 are the data 112 included in the storage object 110 and storage object attributes 114 corresponding to the storage object 110. The storage object attributes 114 include a current owner node indicator 116, metadata 118 that includes ownership validity information 120, and a lock 122. The current owner node indicator 116 indicates which of the nodes included in the computing environment 100 is the current owner node of the storage object 110. The ownership validity information 118 may be used to resolve the validity of ownership of the storage object 110 among the plurality of nodes 102, 104, 106 of the computing environment 100. The lock 122 is a data structure that is required to be possessed by a node before the node can exclusively access the storage object 110. The nodes 102, 104, 106 may maintain local versions 124, 126, 128 of the attributes 114 of the storage object 110.

Therefore, FIG. 1 illustrates certain embodiments in which local versions 122, 126, 128 of attributes 114 of a storage object 110 are stored at a plurality of nodes 102, 104, 106, wherein a first attribute, referred to as a current owner node 116, designates a node of the plurality of nodes as an owner node for the storage object 110, and wherein a second attribute, referred to as metadata 118, includes information 120 to resolve the validity of ownership of the storage object 110 among the plurality of nodes. In further embodiments, each node of the plurality of nodes 102, 104, 106 comprises a cluster of a plurality of clusters 102, 104, 106, wherein the plurality of clusters 102, 104, 106 comprise a domain, and wherein the storage object 110 is a shared object for the plurality of clusters 102, 104, 106 of the domain, and wherein a stored object that is shared is a logical object that is physically stored on a device included in the domain.

Figure 2:
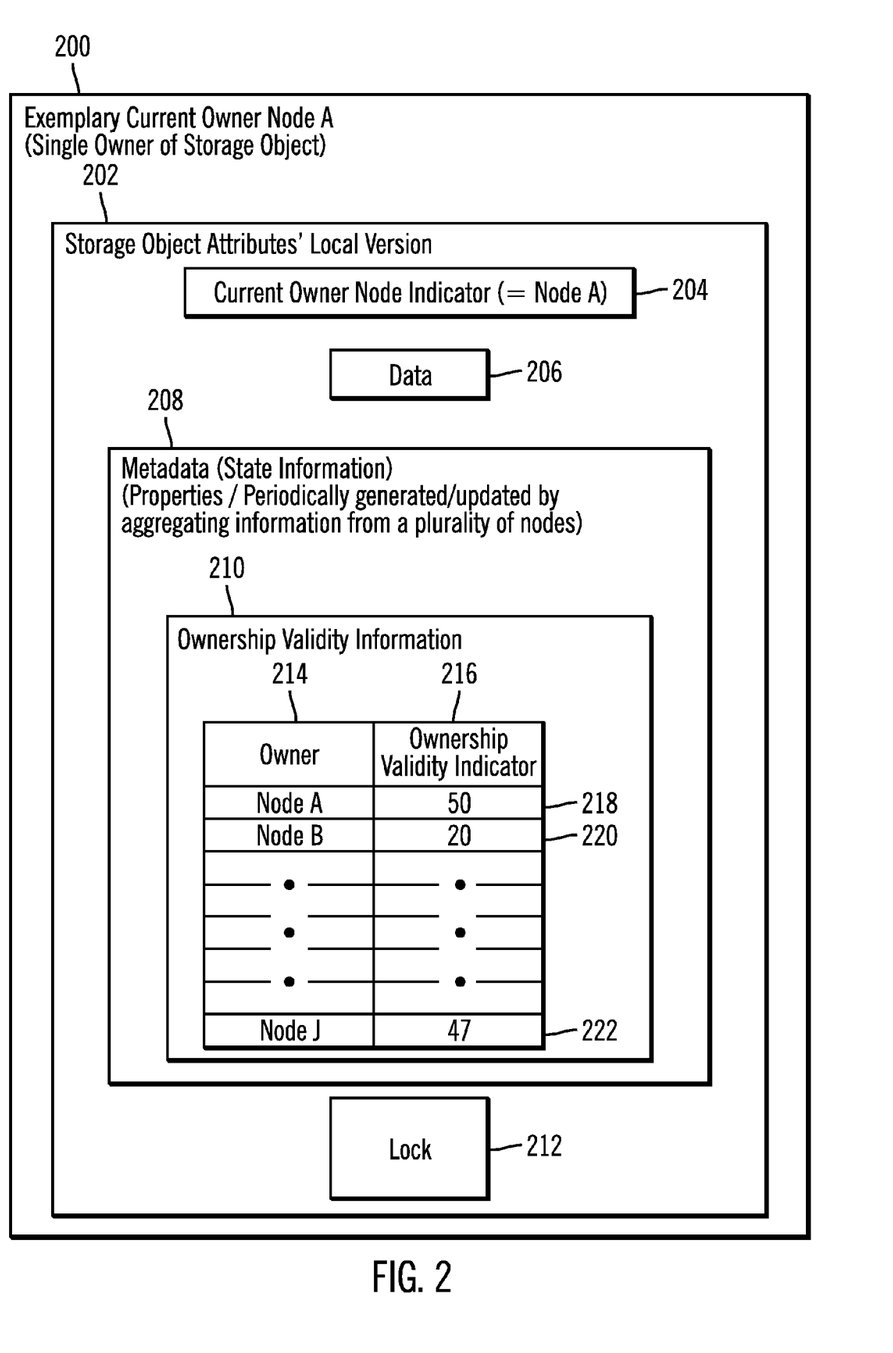
FIG. 2 illustrates a block diagram that shows data structures included in an exemplary current owner node, in accordance with certain embodiments.

FIG. 2 illustrates a block diagram that shows data structures included in an exemplary current owner node 200, in accordance with certain embodiments. While FIG. 2 shows that the current owner node is "Node A" (corresponding to node 102 of FIG. 1), in alternative embodiments the exemplary current owner node 200 may correspond to any of the nodes 102, 104, 106 of the computing environment 100 shown in FIG. 1. At any given time, the exemplary current owner node 200 may be the single owner of the storage object 110 shown in FIG. 1.

The storage object attributes' local version 200 (corresponds to storage object attribute' local version 124 of FIG. 1) associated with the exemplary current owner node 200 may include the current owner node indicator 204, the data 206 corresponding to the storage object currently owned by the exemplary current owner node 200, the metadata 208 including ownership validity information 210, and the lock 212.

The metadata 208 may be periodically generated and/or updated by aggregating information from the plurality of nodes 102, 104, 106 of the computing environment 100. The ownership validity information 210 may include for each of the potential owners 214 of the storage object 110 an ownership validity indicator 216. For example in the illustrative table representing the ownership validity information 210, row 218 shows that "Node A" has an ownership validity indicator with value 50, row 220 shows that "Node B" has an ownership validity indicator with value 20, and row 222 shows that "Node J" has an ownership validity indicator with value 47. In this particular exemplary embodiment, the current node indicator 204 shows that the current owner is "Node A" which also has the highest value for the ownership validity indicator 216. In certain embodiments, the ownership validity indicator 216 for a node may be used to determine whether to allow another node to inherit ownership of the storage object 110 once the owner node surrenders ownership of the storage object 110.

Figure 3:
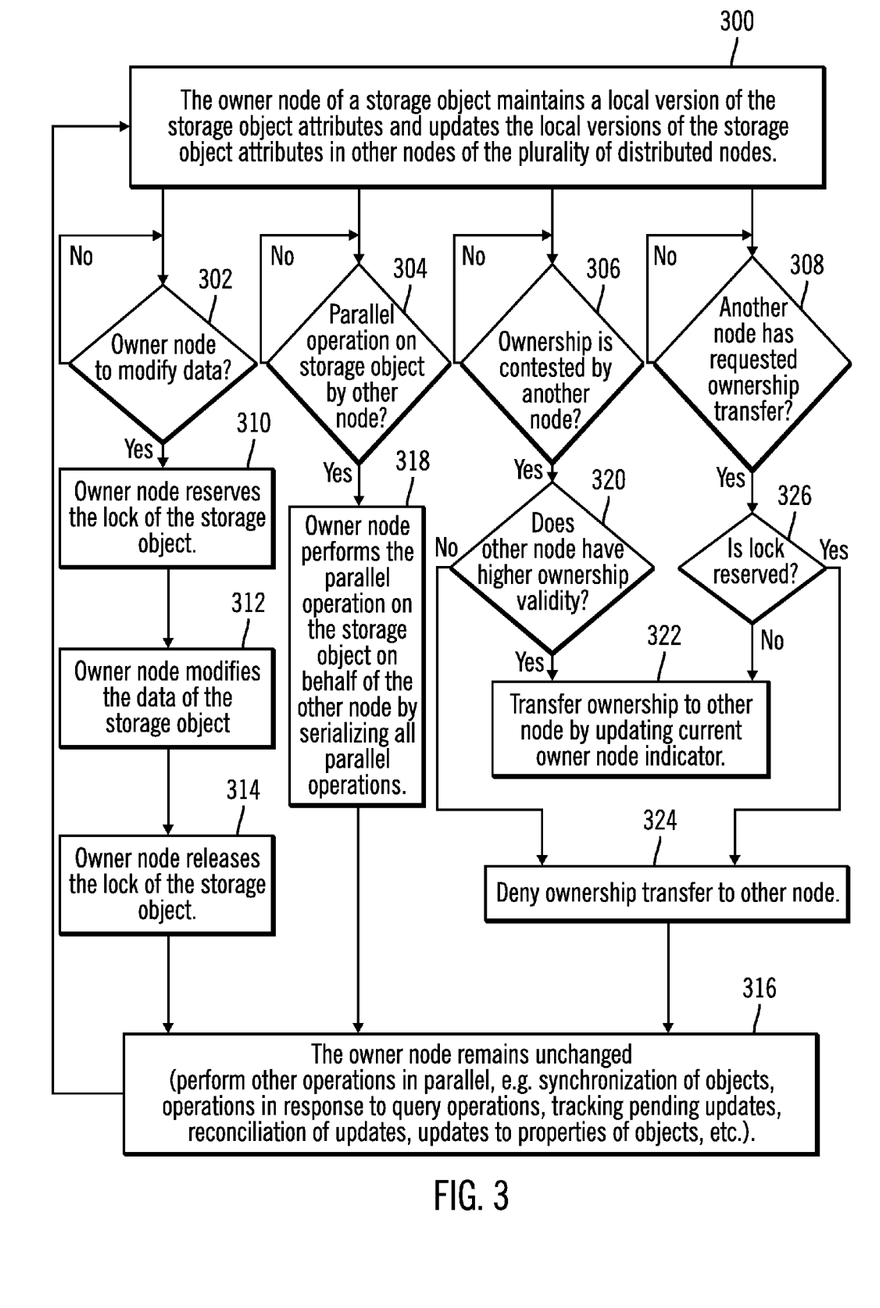
FIG. 3 illustrates first operations implemented in the computing environment, in accordance with certain embodiments.

FIG. 3 illustrates first operations implemented in the computing environment 100, in accordance with certain embodiments. The first operations may be performed by software, firmware, or hardware of any combination thereof implemented in any or all of the plurality of nodes 102, 104, 106 of the computing environment 100.

Control starts at block 300, wherein the owner node, such as exemplary node A 102, of a storage object 110 maintains a local version 124 of the storage object attributes and updates the local versions 126, 128 of the storage object attributes 104, 106 in other nodes 104, 106 of the plurality of distributed nodes, wherein control may proceed to any of block 302, 304, 306, 308 from block 300.

At block 302 a determination is made as to whether the owner node 102 needs to modify the data 112 associated with the storage object 110 that is owned by the owner node. If so, then the owner node 102 reserves (at block 310) the lock 122 of the storage object 110. The owner node modifies (at block 312) the data of the storage object 110 and then releases (at block 314) the lock 122 of the storage object 110. Control proceeds to block 316 where the owner node performs other tasks such as synchronization of objects, operations in response to query operations, tracking of pending updates, reconciliation of updates, updates to properties of objects, etc. If at block 302 a determination is made that the owner node 102 does not need to modify the data 112 associated with the storage object 110 then after an interval of time it is again determined whether the owner node 102 needs to modify the data 112 associated with the storage object 110. In certain alternative embodiments, some of the synchronization and reconciliation may require the lock 122 as well in order to prevent the movement of ownership while the synchronization or reconciliation occurs.

At block 304 a determination is made as to whether a parallel operation needs to be performed on the storage object 110 by another node besides the owner node 102, wherein the storage object 110 is owned by the owner node 102. If so, the owner node 102 performs (at block 318) the parallel operation on the storage object 110 on behalf of the other node by serializing all parallel operations, and control proceeds to block 316. If at block 304 a determination is made that a parallel operation does not need to be performed on the storage object 110 by another node then after an interval of time it is again determined whether a parallel operation needs to be performed on the storage object 110 by another node besides the owner node 102.

At block 306, a determination is made as to whether ownership of the storage object 110 is contested by another node. If so, then it is determined (at block 320) whether the other node has a higher ownership validity than the current owner node, where the ownership validity may be determined from the ownership validity indicator 216. If the other node has a higher ownership validity than the current owner node then ownership is transferred (at block 322) by updating the current owner node indicator 116, 204. If the other node does not have ownership validity that is higher than the current owner node then control proceeds to block 324, where transfer of ownership of the storage object 110 is denied to the other node, and control proceeds to block 316. If at block 306, a determination is made that the ownership of the storage object 110 is not contested by another node, then after waiting for a period of time a determination is made once again as to whether the ownership of the storage object 110 is contested by another node.

At block 308, a determination is made as to whether another node has requested ownership transfer of the storage object 110. If so, then a determination (at block 326) is made as to whether the lock 122 is reserved. If the lock 122 is not reserved, then ownership is transferred to the other node by updating the current owner node indicator 116. If the lock is reserved, then ownership transfer is denied (at block 324) to the other node and control proceeds to block 316. If at block 308, a determination is made that another node has not requested ownership transfer of the storage object 110, then after a period of time a determination is made once again as to whether another node another node has requested ownership transfer of the storage object 110.

FIG. 3 illustrates certain exemplary operations performed within the computing environment 100. Furthermore, in certain embodiments the owner node 102 receives a request for a query operation on the storage object 110 or on properties of the storage object 110 on behalf of another node, and the owner node performs the query operation on the storage object 110 without transfer of ownership of the storage object 110 and without being required to lock down the storage object 110. The owner node 102 may also initiate equivalent updates against the storage object 110 and corresponding properties of the storage object 110 against one or more other nodes when the one or more other nodes are available. Additionally, the owner node 102 may track pending updates against the storage object 110 and corresponding properties of the storage object 110 against one or more other nodes when the one or more other nodes become unavailable.

In certain embodiments, only the owner node 102 can reconcile all pending updates against the storage object 110 and the corresponding properties of the storage object 110 to the one or more other nodes when the one or more other nodes become available. The owner node 102 may initiate transfer of ownership of the storage object 110 to another node of the plurality of nodes when the owner node 102 is to become unavailable. The owner node 102 performs a reconciliation process prior to surrendering ownership of the storage object 110 to another node that is marked as down-level with respect to the storage object 110 or to the corresponding properties of the storage object 110, wherein the another node requests the reconciliation process without ownership transfer. In further embodiments updates to properties of a storage object within another node initiated by the owner node 102 only occurs after validating ownership level properties (i.e., ownership validity indicator 216) of the owner node 102 with respect to ownership level properties of the another node.

Figure 4:
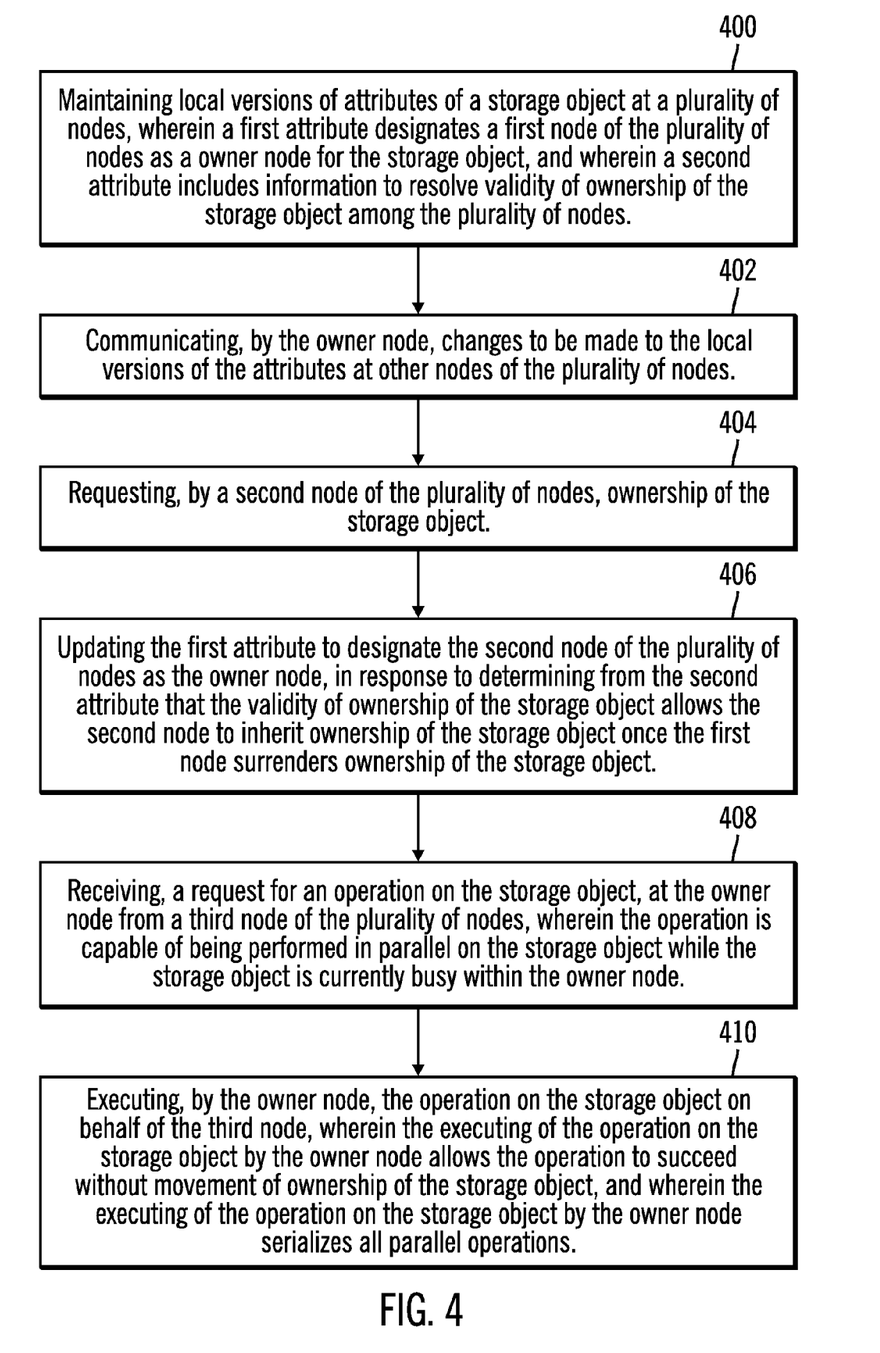
FIG. 4 illustrates second operations implemented in the computing environment, in accordance with certain embodiments.

FIG. 4 illustrates second operations implemented in the computing environment 100, in accordance with certain embodiments. The second operations may be performed by software, firmware, or hardware of any combination thereof implemented in any or all of the plurality of nodes 102, 104, 106 of the computing environment 100.

Control starts at block 400, where local versions 124, 126, 128 of attributes of a storage object 110 are maintained at a plurality of nodes, wherein a first attribute 116 (current owner node indicator 116) designates a first node 102 of the plurality of nodes 102, 104, 106 as an owner node for the storage object, and wherein a second attribute 118 (metadata 118) includes information 120 (ownership validity information 120) to resolve validity of ownership of the storage object 110 among the plurality of nodes 102, 104, 106.

The owner node communicates (at block 402) changes to be made to the local versions of the attributes at other nodes of the plurality of nodes. A second node of the plurality of nodes requests (at block 404) ownership of the storage object 110. The first attribute 116 is updated (at block 406) to designate the second node of the plurality of nodes as the owner node, in response to determining from the second attribute 118 that the validity of ownership of the storage object 110 allows the second node to inherit ownership of the storage object 110 once the first node 102 surrenders ownership of the storage object. Inheritance of ownership can be determined from the ownership validity indicator 216 shown in FIG. 2 that may be included within the ownership validity information 120 of the second attribute 118. A node having a higher value for the ownership validity indicator 216 can inherit ownership of a storage object from a node having a lower value for the ownership validity indicator 216. In certain embodiments, a node having a higher value for the ownership validity indicator 216 may dictate which node is the current owner of a storage object, and if the current owner node is unaware of the role to be undertaken by the current owner node then the current owner node may inherit the ownership through the synchronization of the validity indicator information.

Control proceeds to block 408, where a request for an operation on the storage object 110 is received at the owner node 102 from a third node of the plurality of nodes, wherein the operation is capable of being performed in parallel on the storage object 110 while the storage object 110 is currently busy within the owner node 102. The owner node 102 executes (at block 410) the operation on the storage object 110 on behalf of the third node, wherein the executing of the operation on the storage object 110 by the owner node 102 allows the operation to succeed without movement of ownership of the storage object 110, and wherein the executing of the operation on the storage object 110 by the owner node serializes all parallel operations.

Certain embodiments illustrated in FIGS. 1-4 provide mechanisms for atomically managing the usage of a shared storage object 110 among a plurality of distributed sites 102, 104, 106, wherein the plurality of distributed sites can all attempt to access to the shared storage object 110.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
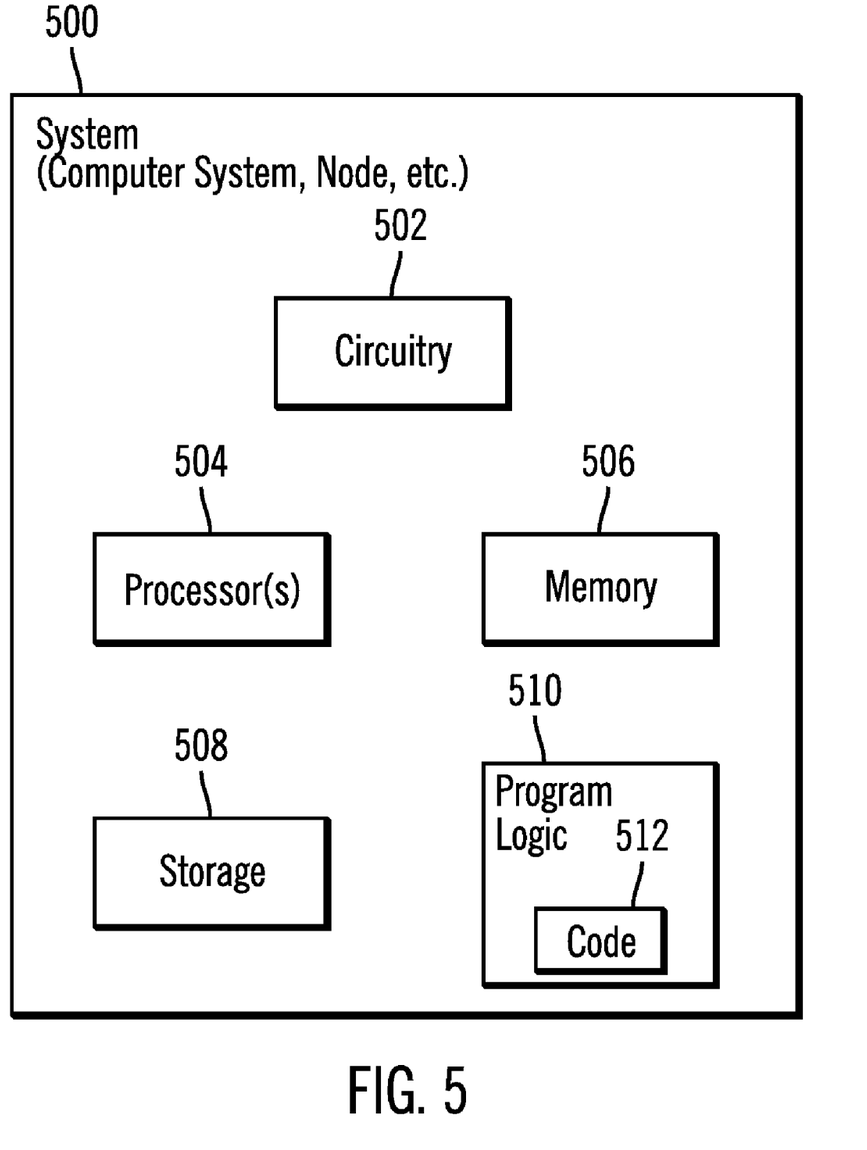
FIG. 5 illustrates a block diagram that shows certain elements that may be included in a node of the computing environment, in accordance with certain embodiments.

FIG. 5 illustrates a block diagram that shows certain elements that may be included nodes 102, 104, 106, in accordance with certain embodiments. One or more of the nodes 102, 104, 106 either individually or collectively may also be referred to as a system, and may include a circuitry 502 that may in certain embodiments include a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

maintaining local versions of attributes of a storage object at a plurality of nodes, wherein a first attribute designates a first node of the plurality of nodes as an owner node for the storage object, and wherein a second attribute includes information to resolve validity of ownership of the storage object among the plurality of nodes via an ownership validity information data structure, wherein ownership validity level for each node of the plurality of nodes is provided by the ownership validity information data structure;

communicating, by the owner node, changes to be made to the local versions of the attributes at other nodes of the plurality of nodes;

requesting, by a second node of the plurality of nodes, ownership of the storage object;

updating the first attribute to designate the second node of the plurality of nodes as the owner node, in response to determining for the storage object that the ownership validity level corresponding to the second node is greater than the ownership validity level corresponding to the first node;

receiving, a request for an operation on the storage object, at the owner node from a third node of the plurality of nodes, wherein the third node is a peer node of the owner node, wherein the operation is capable of being performed in parallel on the storage object while the storage object is currently busy within the owner node, wherein the operation is not a protected operation, and wherein the protected operation on the storage object is performed only by the owner node of the storage object; and executing, by the owner node, the operation on the storage object on behalf of the third node that is the peer node of the owner node, wherein the executing of the operation on the storage object by the owner node allows the operation to succeed without movement of ownership of the storage object, and wherein the executing of the operation on the storage object by the owner node serializes all parallel operations, wherein the attributes are properties of the storage object, and wherein: the owner node receives a request for a query operation on the storage object or on properties of the storage object on behalf of the third node, and the owner node performs the query operation on the storage object without transfer of ownership of the storage object and without being required to lock down the storage object; the owner node initiates equivalent updates against the storage object and corresponding properties of the storage object against one or more other nodes when the one or more other nodes are available; the owner node tracks pending updates against the storage object and corresponding properties of the storage object against the one or more other nodes when the one or more other nodes become unavailable; only the owner node can reconcile all pending updates against the storage object and the corresponding properties of the storage object to the one or more other nodes when the one or more other nodes become available; the owner node initiates a transfer of ownership of the storage object to another node of the plurality of nodes when the owner node is to become unavailable; the owner node performs a reconciliation process prior to surrendering ownership of the storage object to another node that is marked as down-level with respect to the storage object or to the corresponding properties of the storage object, wherein the another node requests the reconciliation process without ownership transfer; and updates to properties of a storage object within another node initiated by the owner node only occurs after validating ownership level properties of the owner node with respect to ownership level properties of the another node.

2. The method of claim 1, further comprising:
reserving a lock on the storage object, by the owner node, in response to determining that the owner node needs to modify data of the storage object;
modifying the data of the storage object, by the owner node, in response to reserving the lock; and
releasing the lock on the storage object, by the owner node, in response to modifying the data on the storage object, wherein the releasing of the lock permits a node that is different from the owner node in the plurality of nodes to request ownership of the storage object.

3. The method of claim 1, wherein each node of the plurality of nodes comprises a cluster of a plurality of clusters, wherein the plurality of clusters comprise a domain, wherein the storage object is a shared object for the plurality of clusters of the domain, wherein a stored object is a logical object that is physically stored on a device included in the domain, the method further comprising:
receiving, a request at the owner node from the third node, for transfer of ownership of the storage object;
determining, whether a lock on the storage object is reserved by the owner node; and transferring, the ownership to the third node, in response to determining that the lock on the storage object is not reserved by the owner node.

4. A system, comprising:
a memory; and
a processor coupled to the memory, wherein the processor executes operations, the operations comprising:
maintaining local versions of attributes of a storage object at a plurality of nodes, wherein a first attribute designates a first node of the plurality of nodes as an owner node for the storage object, and wherein a second attribute includes information to resolve validity of ownership of the storage object among the plurality of nodes via an ownership validity information data structure, wherein ownership validity level for each node of the plurality of nodes is provided by the ownership validity information data structure;
communicating, by the owner node, changes to be made to the local versions of the attributes at other nodes of the plurality of nodes;
requesting, by a second node of the plurality of nodes, ownership of the storage object;
updating the first attribute to designate the second node of the plurality of nodes as the owner node, in response to determining for the storage object that the ownership validity level corresponding to the second node is greater than the ownership validity level corresponding to the first node;
receiving, a request for an operation on the storage object, at the owner node from a third node of the plurality of nodes, wherein the third node is a peer node of the owner node, wherein the operation is capable of being performed in parallel on the storage object while the storage object is currently busy within the owner node, wherein the operation is not a protected operation, and wherein the protected operation on the storage object is performed only by the owner node of the storage object; and
executing, by the owner node, the operation on the storage object on behalf of the third node that is the peer node of the owner node, wherein the executing of the operation on the storage object by the owner node allows the operation to succeed without movement of ownership of the storage object, and wherein the executing of the operation on the storage object by the owner node serializes all parallel operations, wherein the attributes are properties of the storage object, and wherein: the owner node receives a request for a query operation on the storage object or on properties of the storage object on behalf of the third node, and the owner node performs the query operation on the storage object without transfer of ownership of the storage object and without being required to lock down the storage object; the owner node initiates equivalent updates against the storage object and corresponding properties of the storage object against one or more other nodes when the one or more other nodes are available; the owner node tracks pending updates against the storage object and corresponding properties of the storage object against the one or more other nodes when the one or more other nodes become unavailable; only the owner node can reconcile all pending updates against the storage object and the corresponding properties of the storage object to the one or more other nodes when the one or more other nodes become available; the owner node initiates a transfer of ownership of the storage object to another node of the plurality of nodes when the owner node is to become unavailable; the owner node performs a reconciliation process prior to surrendering ownership of the storage object to another node that is marked as down-level with respect to the storage object or to the corresponding properties of the storage object, wherein the another node requests the reconciliation process without ownership transfer; and updates to properties of a storage object within another node initiated by the owner node only occurs after validating ownership level properties of the owner node with respect to ownership level properties of the another node.

5. The system of claim 4, the operations further comprising:

reserving a lock on the storage object, by the owner node, in response to determining that the owner node needs to modify data of the storage object;

modifying the data of the storage object, by the owner node, in response to reserving the lock; and releasing the lock on the storage object, by the owner node, in response to modifying the data on the storage object, wherein the releasing of the lock permits a node that is different from the owner node in the plurality of nodes to request ownership of the storage object.

6. The system of claim 4, wherein each node of the plurality of nodes comprises a cluster of a plurality of clusters, wherein the plurality of clusters comprise a domain, wherein the storage object is a shared object for the plurality of clusters of the domain, wherein a stored object is a logical object that is physically stored on a device included in the domain, the operations further comprising:

receiving, a request at the owner node from the third node, for transfer of ownership of the storage object;

determining, whether a lock on the storage object is reserved by the owner node; and transferring, the ownership to the third node, in response to determining that the lock on the storage object is not reserved by the owner node.

7. A computer readable storage device, wherein code stored in the computer readable storage device when executed by a computer causes operations, the operations comprising:

maintaining local versions of attributes of a storage object at a plurality of nodes, wherein a first attribute designates a first node of the plurality of nodes as an owner node for the storage object, and wherein a second attribute includes information to resolve validity of ownership of the storage object among the plurality of nodes via an ownership validity information data structure, wherein ownership validity level for each node of the plurality of nodes is provided by the ownership validity information data structure;

communicating, by the owner node, changes to be made to the local versions of the attributes at other nodes of the plurality of nodes;

requesting, by a second node of the plurality of nodes, ownership of the storage object;

updating the first attribute to designate the second node of the plurality of nodes as the owner node, in response to determining for the storage object that the ownership validity level corresponding to the second node is greater than the ownership validity level corresponding to the first node;

receiving, a request for an operation on the storage object, at the owner node from a third node of the plurality of nodes, wherein the third node is a peer node of the owner node, wherein the operation is capable of being performed in parallel on the storage object while the storage object is currently busy within the owner node, wherein the operation is not a protected operation, and wherein the protected operation on the storage object is performed only by the owner node of the storage object; and executing, by the owner node, the operation on the storage object on behalf of the third node that is the peer node of the owner node, wherein the executing of the operation on the storage object by the owner node allows the operation to succeed without movement of ownership of the storage object, and wherein the executing of the operation on the storage object by the owner node serializes all parallel operations, wherein the attributes are properties of the storage object, and wherein: the owner node receives a request for a query operation on the storage object or on properties of the storage object on behalf of the third node, and the owner node performs the query operation on the storage object without transfer of ownership of the storage object and without being required to lock down the storage object; the owner node initiates equivalent updates against the storage object and corresponding properties of the storage object against one or more other nodes when the one or more other nodes are available; the owner node tracks pending updates against the storage object and corresponding properties of the storage object against the one or more other nodes when the one or more other nodes become unavailable; only the owner node can reconcile all pending updates against the storage object and the corresponding properties of the storage object to the one or more other nodes when the one or more other nodes become available; the owner node initiates a transfer of ownership of the storage object to another node of the plurality of nodes when the owner node is to become unavailable; the owner node performs a reconciliation process prior to surrendering ownership of the storage object to another node that is marked as down-level with respect to the storage object or to the corresponding properties of the storage object, wherein the another node requests the reconciliation process without ownership transfer; and updates to properties of a storage object within another node initiated by the owner node only occurs after validating ownership level properties of the owner node with respect to ownership level properties of the another node.

8. The computer readable storage device of claim 7, the operations further comprising:

reserving a lock on the storage object, by the owner node, in response to determining that the owner node needs to modify data of the storage object;

modifying the data of the storage object, by the owner node, in response to reserving the lock; and releasing the lock on the storage object, by the owner node, in response to modifying the data on the storage object, wherein the releasing of the lock permits a node that is different from the owner node in the plurality of nodes to request ownership of the storage object.

9. The computer readable storage device of claim 7, wherein each node of the plurality of nodes comprises a cluster of a plurality of clusters, wherein the plurality of clusters comprise a domain, wherein the storage object is a shared object for the plurality of clusters of the domain, wherein a stored object is a logical object that is physically stored on a device included in the domain, the operations further comprising:

receiving, a request at the owner node from the third node, for transfer of ownership of the storage object;

determining, whether a lock on the storage object is reserved by the owner node; and transferring, the ownership to the third node, in response to determining that the lock on the storage object is not reserved by the owner node.

10. A method for deploying computing infrastructure, comprising integrating computer-readable code into a computing system, wherein the code in combination with the computing system is capable of performing:

maintaining local versions of attributes of a storage object at a plurality of nodes, wherein a first attribute designates a first node of the plurality of nodes as an owner node for the storage object, and wherein a second attribute includes information to resolve validity of ownership of the storage object among the plurality of nodes via an ownership validity information data structure, wherein ownership validity level for each node of the plurality of nodes is provided by the ownership validity information data structure;

communicating, by the owner node, changes to be made to the local versions of the attributes at other nodes of the plurality of nodes;

requesting, by a second node of the plurality of nodes, ownership of the storage object;

updating the first attribute to designate the second node of the plurality of nodes as the owner node, in response to determining for the storage object that the ownership validity level corresponding to the second node is greater than the ownership validity level corresponding to the first node;

receiving, a request for an operation on the storage object, at the owner node from a third node of the plurality of nodes, wherein the third node is a peer node of the owner node, wherein the operation is capable of being performed in parallel on the storage object while the storage object is currently busy within the owner node, wherein the operation is not a protected operation, and wherein the protected operation on the storage object is performed only by the owner node of the storage object; and executing, by the owner node, the operation on the storage object on behalf of the third node that is the peer node of the owner node, wherein the executing of the operation on the storage object by the owner node allows the operation to succeed without movement of ownership of the storage object, and wherein the executing of the operation on the storage object by the owner node serializes all parallel operations, wherein the attributes are properties of the storage object, and wherein: the owner node receives a request for a query operation on the storage object or on properties of the storage object on behalf of the third node, and the owner node performs the query operation on the storage object without transfer of ownership of the storage object and without being required to lock down the storage object; the owner node initiates equivalent updates against the storage object and corresponding properties of the storage object against one or more other nodes when the one or more other nodes are available; the owner node tracks pending updates against the storage object and corresponding properties of the storage object against the one or more other nodes when the one or more other nodes become unavailable; only the owner node can reconcile all pending updates against the storage object and the corresponding properties of the storage object to the one or more other nodes when the one or more other nodes become available; the owner node initiates a transfer of ownership of the storage object to another node of the plurality of nodes when the owner node is to become unavailable; the owner node performs a reconciliation process prior to surrendering ownership of the storage object to another node that is marked as down-level with respect to the storage object or to the corresponding properties of the storage object, wherein the another node requests the reconciliation process without ownership transfer; and updates to properties of a storage object within another node initiated by the owner node only occurs after validating ownership level properties of the owner node with respect to ownership level properties of the another node.

11. The method for deploying computing infrastructure of claim 10, wherein the code in combination with the computing system is further capable of performing:

reserving a lock on the storage object, by the owner node, in response to determining that the owner node needs to modify data of the storage object;

modifying the data of the storage object, by the owner node, in response to reserving the lock; and releasing the lock on the storage object, by the owner node, in response to modifying the data on the storage object, wherein the releasing of the lock permits a node that is different from the owner node in the plurality of nodes to request ownership of the storage object.

12. The method for deploying computing infrastructure of claim 10, wherein each node of the plurality of nodes comprises a cluster of a plurality of clusters, wherein the plurality of clusters comprise a domain, wherein the storage object is a shared object for the plurality of clusters of the domain, wherein a stored object is a logical object that is physically stored on a device included in the domain, wherein the code in combination with the computing system is further capable of performing:

receiving, a request at the owner node from the third node, for transfer of ownership of the storage object;

determining, whether a lock on the storage object is reserved by the owner node; and transferring, the ownership to the third node, in response to determining that the lock on the storage object is not reserved by the owner node.

\* \* \* \* \*